UNITED STATES PATENT OFFICE.

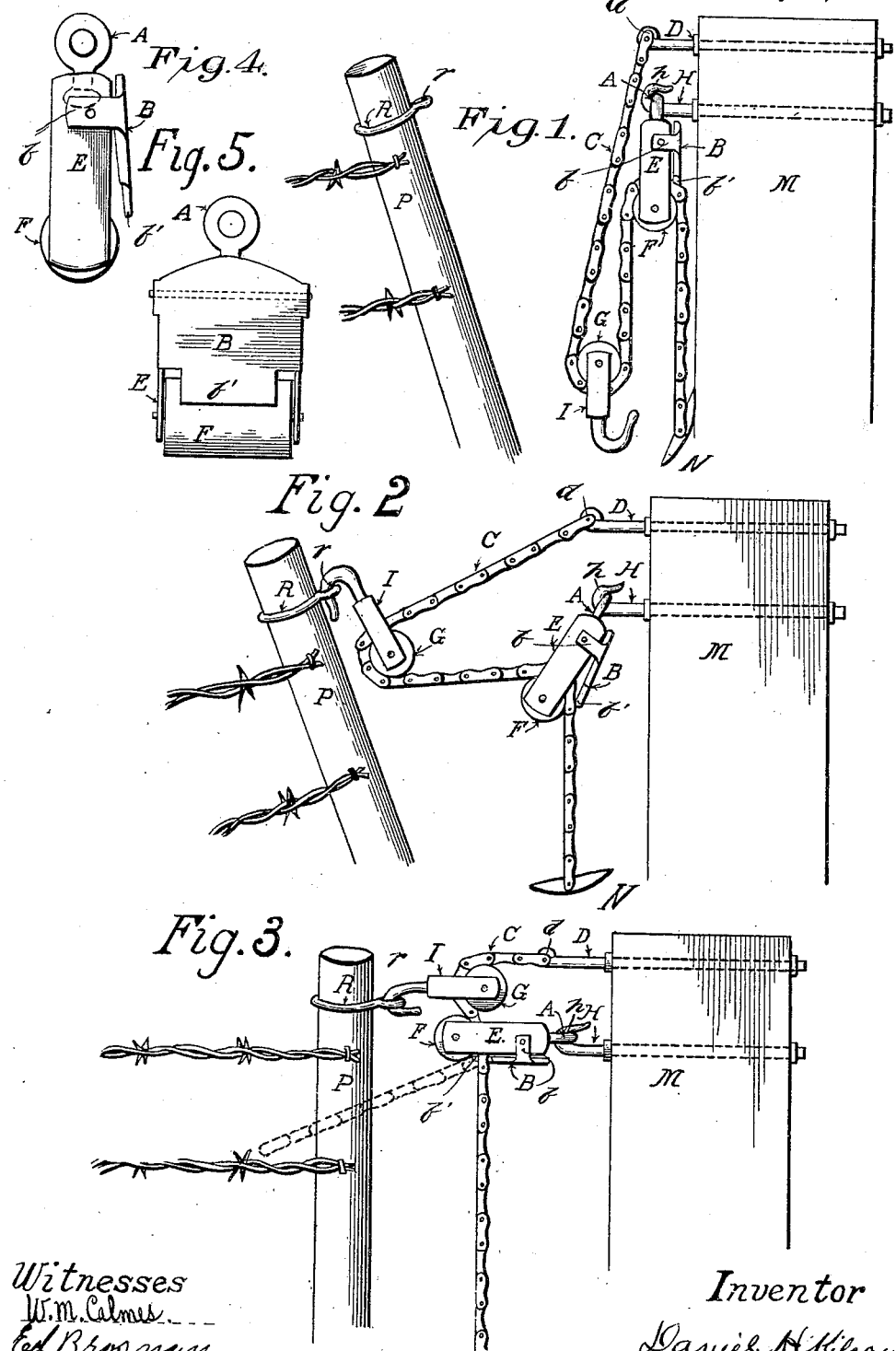

DANIEL H. KILROY, OF ALMA, MONTANA.

GATE-FASTENER.

No. 921,257.   Specification of Letters Patent.   Patented May 11, 1909.

Application filed July 17, 1907. Serial No. 384,230.

*To all whom it may concern:*

Be it known that I, DANIEL H. KILROY, citizen of the United States, residing at Alma, in the county of Chouteau and State of Montana, have invented certain new and useful Improvements in Gate-Fasteners, of which the following is a specification.

The present invention relates to an improved gate stretching and fastening device for use in connection with gates of that type which embody a fixed or stationary gate post and a movable gate post the upper end of which is adapted to swing away from the stationary gate post.

The object of the invention is the provision of a gate fastener of this character which may be quickly manipulated to open the gate or to close the same and draw the wires taut, and which can not be rubbed open by stock.

For a full understanding of the invention and the merits thereof and also to acquire a knowledge of the details of construction and the means for effecting the result, reference is to be had to the following description and accompanying drawings, in which:

Figure 1 is a side elevation showing the improved fastener applied to a gate, the movable gate post being swung away from the fixed gate post and the fastening device hanging in an inoperative position. Fig. 2 is a similar view showing the fastening device as placed in engagement with the movable gate post previous to drawing the same into a closed position. Fig. 3 is also a similar view showing the position of the parts when the gate is closed and also indicating in dotted lines the position to which the cable is swung when it is desired to open the gate. Fig. 4 is an enlarged end view of the frame which is loosely connected to the fixed gate post. Fig. 5 is a side elevation of the same.

Corresponding and like parts are referred to in the following description and indicated in all the views of the drawings by the same reference characters.

The invention is shown as applied to a gate comprising the fixed gate post M and the movable post P having the fence wires connected thereto as shown and adapted to have the upper end thereof swung toward and away from the fixed post. A collar R is applied to the upper end of the movable post P and the said collar is formed with an eye $r$. Extending transversely through the upper end of the fixed gate post M are the bolts D and H, the bolt D projecting beyond the post and terminating in the eye $d$ while the bolt H terminates in the hook $h$. A flexible member such as the chain C is loosely connected to the eye $d$ of the bolt D and extends around the guide wheel G of a pulley I, the said pulley being formed with a hook adapted to detachably engage the eye $r$ of the movable post P. After passing around this guide wheel G the chain C extends around a similar wheel F journaled between the side pieces of a frame E at one end thereof, the opposite end of the frame having a swiveled connection with an eye A which loosely engages the hooked termination $h$ of the bolt H. A handle N is applied to the extremity of the chain C and it will be obvious that by engaging the hook upon the pulley I with the eye $r$ of the movable post P and pulling upon the handle N the movable post will be swung inwardly toward the fixed post so as to close the gate and produce tension in the fence wires. The invention also contemplates means for locking the chain C against backward movement and for this purpose a pawl B is carried by the frame E and is adapted to engage the chain so as to lock the gate in a closed position. In the present instance this pawl B is shown as provided upon its sides with the laterally projecting arms $b$ which embrace opposite sides of the frame E and are pivotally connected thereto. It will also be observed that the said pawl terminates in a tongue $b'$ adapted to enter the openings in the chain C so as to prevent backward movement of the same over the pulley or guide member F. However, when the chain C is swung approximately into alinement with the pawl as indicated in dotted lines in Fig. 3 the said pawl will drop into an inoperative position and the chain can be pulled backward over the guide wheels F and G so as to permit the movable post P swinging away from the fixed gate post M. When the gate is open and it is desired to pass through the same the pulley I is disengaged from the eye $r$ of the gate post and hangs in the position shown in Fig. 1. However, when it is desired to close the gate the said pulley I is caused to engage the eye $r$ as indicated in Fig. 2 and a pull is exerted upon the handle N, the device being thereby caused to act as a block and tackle for closing the gate and drawing the wires taut. As shown in Fig. 3 the pawl B serves to engage the chain C and lock the gate in a closed position so that it can not be rubbed open or otherwise accidentally opened by stock.

Having thus described the invention, what is claimed as new is:

In a device of the character described, the combination of a stationary gate post, a movable gate post, a collar applied to the upper end of the movable gate post and formed with an eye, a pulley detachably connected to the said eye, a hook upon the stationary gate post, a frame having a swivel connection with the said hook, a guide member journaled upon the frame, a flexible member passing around the pulley of the movable post and the guide member of the frame and having one end thereof connected to the stationary post, and a pawl pivotally mounted upon the frame for engagement with the flexible member to prevent backward movement thereof.

In testimony whereof I affix my signature in presence of two witnesses.

DANIEL H. KILROY. [L. S.]

Witnesses:
ED. BROSNAN,
EVAN P. KILROY.